(12) United States Patent
Tao et al.

(10) Patent No.: US 8,797,690 B2
(45) Date of Patent: Aug. 5, 2014

(54) MASS BALANCED FLEXURE GIMBAL FOR HEAD GIMBAL ASSEMBLY SWAY MODE CONTROL

(71) Applicant: HGST Netherlands B.V., Amsterdam (NL)

(72) Inventors: Kathryn Tao, Clayton, CA (US); Stephen Williams, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/720,903

(22) Filed: Dec. 19, 2012

(65) Prior Publication Data

US 2014/0168813 A1 Jun. 19, 2014

(51) Int. Cl.
 *G11B 5/60* (2006.01)
(52) U.S. Cl.
 USPC .................. 360/294.4; 360/294.1; 360/234.6; 360/245.3; 360/245.7
(58) Field of Classification Search
 USPC .......... 360/294.1, 294.2, 294.3, 294.4, 234.6, 360/245, 245.1, 245.3, 245.6, 245.7
 See application file for complete search history.

(56) References Cited

U.S. PATENT DOCUMENTS

| | | | |
|---|---|---|---|
| 6,233,124 B1 | 5/2001 | Budde et al. | |
| 7,046,486 B1 | 5/2006 | Coffey | |
| 8,018,686 B2 * | 9/2011 | Yao | 360/245.5 |
| 8,125,741 B2 | 2/2012 | Shelor | |
| 8,134,809 B2 | 3/2012 | Yao et al. | |
| 8,144,435 B2 | 3/2012 | Greminger et al. | |
| 8,149,545 B1 | 4/2012 | Chai et al. | |
| 8,169,745 B2 | 5/2012 | Yao et al. | |
| 8,228,642 B1 | 7/2012 | Hahn et al. | |
| 2004/0100736 A1 * | 5/2004 | Kuwajima et al. | 360/294.4 |
| 2005/0013056 A1 * | 1/2005 | Kuwajima et al. | 360/294.4 |
| 2006/0279880 A1 * | 12/2006 | Boutaghou et al. | 360/294.4 |
| 2008/0180846 A1 * | 7/2008 | Hirano | 360/234.3 |
| 2009/0027807 A1 * | 1/2009 | Yao et al. | 360/245.1 |
| 2009/0244786 A1 * | 10/2009 | Hatch | 360/294.4 |

OTHER PUBLICATIONS

V. Thaveeprungsripom, "Enhancing suspension performance with 3-ply laminated load beam", Magnetic Recording Conference, Dec. 10, 2002, Digest of the Asia-Paific, 2002, TU-P-22-01-TU-P-22-02, IEEE.

* cited by examiner

*Primary Examiner* — Jefferson Evans
(74) *Attorney, Agent, or Firm* — John D. Henkhaus (57) ABSTRACT

Approaches to a mass balanced flexure gimbal assembly for controlling the sway mode of the loadbeam portion of the suspension of a head gimbal assembly (HGA) of a hard-disk drive (HDD). The sway mode of concern is that which is excited when a head slider is actuated by a plurality of piezo actuation devices of a secondary actuation system. A suspension includes a mass attached to the suspension flexure and configured for balancing a moment force about the gimbal, about which a slider rotates when microactuated. The mass is located on the side of the slider opposing the side on which the piezo actuation devices are mounted, to counteract the mass of the piezo devices.

11 Claims, 12 Drawing Sheets

MASS BALANCED FLEXURE GIMBAL FOR HEAD GIMBAL ASSEMBLY SWAY MODE CONTROL

FIELD OF THE INVENTION

Embodiments of the invention relate to a mass balanced flexure gimbal for controlling sway mode associated with a head gimbal assembly (HGA).

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head transducer (also referred to as a "read/write head" or simply "head") which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head, which is housed in a slider, and the surface of a magnetic-recording disk must be tightly controlled. Suspensions have a spring-like quality which biases or urges the air bearing surface (ABS) of the slider against the disk to enable the creation of the air bearing film between the slider and disk surface. An actuator relies in part on the suspension's force on the slider and on the aerodynamic characteristics of the slider ABS to provide the proper distance between the read/write head and the surface of the magnetic-recording disk (the "flying height") while the magnetic-recording disk rotates. A slider therefore is said to "fly" over the surface of the magnetic-recording disk.

An HDD includes at least one head gimbal assembly (HGA) that generally includes a slider that houses the head, and a suspension. Each slider is attached to the free end of a suspension that in turn is cantilevered from the rigid arm of an actuator. Several semi-rigid arms may be combined to form a single movable unit, a head stack assembly (HSA), having either a linear bearing or a rotary pivotal bearing system. The suspension of a conventional disk drive typically includes a relatively stiff load beam with a mount plate at the base end, which subsequently attaches to the actuator arm, and whose free end mounts a flexure that carries the slider and its head. Disposed between the mount plate and the functional end of the load beam is a "hinge" that is compliant in the vertical bending direction (normal to the disk surface). The hinge enables the load beam to suspend and load the slider and the read/write head toward the spinning disk surface. It is then the job of the flexure to provide gimbaled support for the slider so that the read/write head can pitch and roll in order to adjust its orientation.

The flexure in an integrated lead suspension is generally made out of a laminated multilayer material. Typically, it consists of a support layer (e.g., steel), a dielectric insulating layer (e.g., polyimide), a conductor layer (e.g., copper), and a cover layer (e.g., polyimide) that insulates the conductor layer. The electrical lead lines are etched into the conductor layer, while the polyimide layer serves as the insulator from the underlying steel support layer. The steel support layer is also patterned to provide strength and gimbaling characteristics to the flexure. The conducting leads, called traces, which electrically connect the head transducer to the read/write electronics, are often routed on both sides of the suspension, especially in the gimbal region. Normally the traces consist of copper conductor with polyimide dielectric insulating and cover layers but no support stainless steel layer and only provide the electrical function. The primary mechanical support function is provided by the flexure legs (e.g., steel) which normally run adjacent to the traces.

Increasing areal density has led to the necessary development and implementation of secondary actuators for improved head positioning through relatively fine positioning, in addition to a primary voice coil motor (VCM) actuator which provides relatively coarse positioning. Some hard disk drives employ micro- or milli-actuator designs to provide second stage actuation of the recording head to enable more accurate positioning of the head relative to the recording track. Milli-actuators are broadly classified as actuators that move the entire front end of the suspension: spring, load beam, flexure and slider. Micro-actuators are broadly classified as actuators that move only the slider, moving it relative to the load beam, or moving the read-write element only, moving it relative to the slider body.

However, micro-actuator mechanisms and designs that are not perfectly collocated with slider assemblies, when driven, often times excite unwanted modes of vibration. These excited modes, involving other structures (e.g. loadbeam) in addition to the microactuator and slider itself, can lead to significant head offtrack. Since these modes often times are at frequencies lower than the primary microactuator mode, resulting servo bandwidth may be compromised.

SUMMARY OF EMBODIMENTS OF THE INVENTION

Embodiments of the invention are directed at a mass balanced flexure gimbal for controlling the sway mode of vibration of, for example, the loadbeam portion of the suspension of a head gimbal assembly (HGA) of a hard-disk drive (HDD). The sway mode of concern is that which is excited when a head slider is actuated by a plurality of piezo actuation devices of a secondary actuation system.

In embodiments, a suspension includes a mass attached to the suspension flexure and configured for balancing a moment force about the gimbal about which a slider rotates when microactuated. The mass is located on the side of the slider opposing the side on which the piezo actuation devices are mounted, to counteract the mass of the piezo devices.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to a mass balanced flexure gimbal for controlling a sway mode of vibration of the suspension of a head gimbal assembly (HGA) of a hard-disk drive (HDD), are described. The sway mode of concern is that which is excited when a head slider is actuated by a plurality of piezo actuation devices of a secondary actuation system.

In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Embodiments of the invention may be used to control a vibration mode of a head gimbal assembly (HGA) of a hard-disk drive (HDD) storage device. In particular, embodiments may be used to control the sway mode associated with the load beam portion of the suspension, as well as to control unwanted yawing of a flexure/slider/microactuator assembly, when being driven by the microactuator. This mode, when excited, can lead to significant head offtrack.

Figure 1:
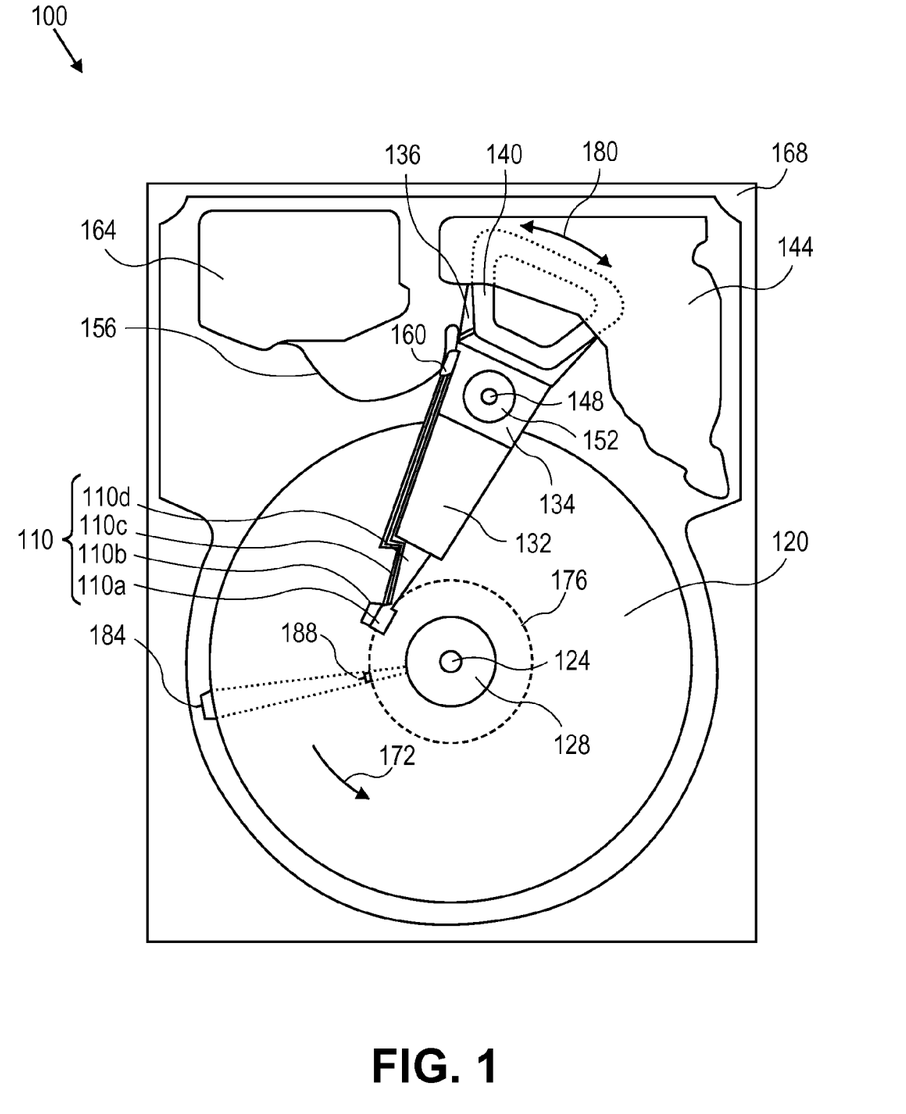
FIG. 1 is a plan view of an HDD, according to an embodiment of the invention.

FIG. 1 is a plan view of an HDD according to an embodiment of the invention. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head 110a, a lead suspension 110c attached to the head 110a, and a load beam 110d attached to the slider 110b, which includes the head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the disk 120.

The head 110a includes a write element and a read element for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown). The armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, electrical signals, for example, current to the voice coil 140 of the VCM, write signal to and read signal from the head 110a, are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184.

Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110*a* to follow the track 176. Upon finding the track 176 and identifying a particular sectored track portion 188, the head 110*a* either reads data from the track 176 or writes data to the track 176 depending on instructions received by the disk controller from an external agent, for example, a microprocessor of a computer system.

Embodiments of the invention also encompass HDD 100 that includes the HGA 110, the disk 120 rotatably mounted on the spindle 124, the arm 132 attached to the HGA 110 including the slider 110*b* including the head 110*a*.

Figure 2:
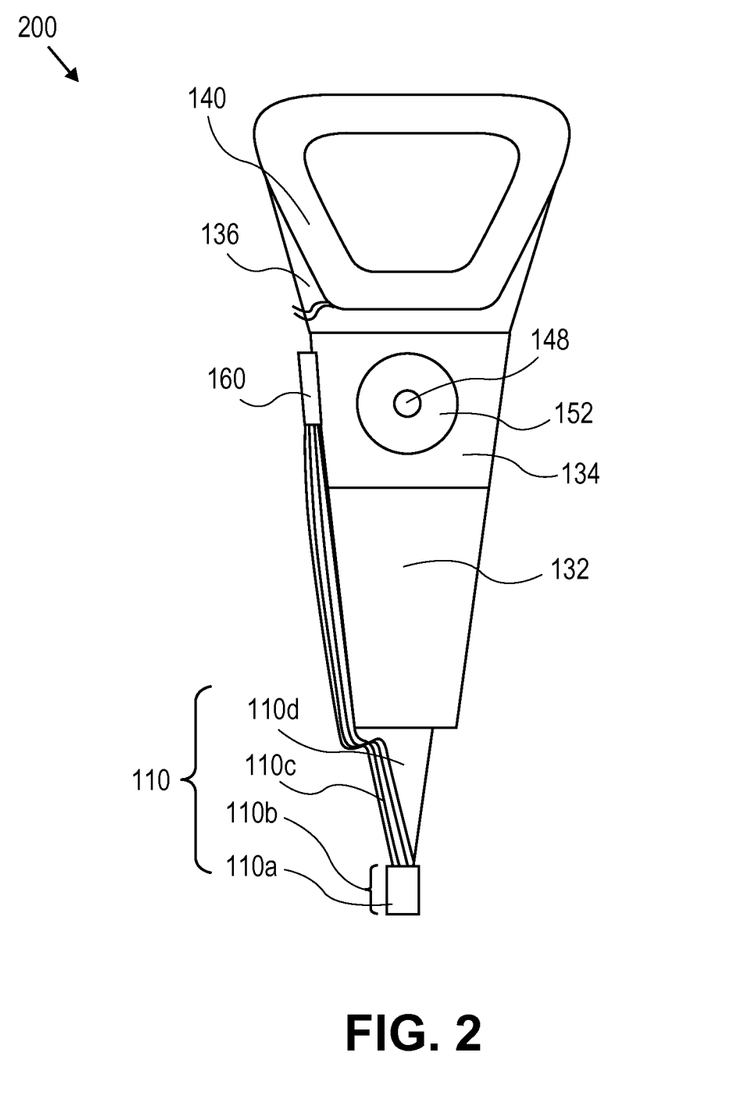
FIG. 2 is a plan view of a head-arm-assembly (HAA), according to an embodiment of the invention.

FIG. 2 is a plan view of a head-arm-assembly (HAA), according to an embodiment of the invention. FIG. 2 illustrates the functional arrangement of the HAA with respect to the HGA 110. The HAA includes the arm 132 and HGA 110 including the slider 110*b* including the head 110*a*. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Flexure Gimbal Assembly

Embodiments of the invention are relevant to HGA microactuator designs. For example, embodiments may be particularly applicable to, but are not limited to, a flexure-integrated microactuator system such as the one described in U.S. Pat. No. 8,085,508 (the '508 patent), the subject matter of which is incorporated by reference for all purposes as if fully set forth herein. The microactuator system described in the referenced '508 patent comprises two piezoelectric (PZT) motors placed within the flexure gimbal and located just proximal to the slider when viewed from the point of origin of the primary VCM actuator. Because the location of the PZT motors causes a mass imbalance of the rotating body about the axis of rotation, the moment forces applied by the PZT motors are likewise imbalanced about the axis of rotation. Consequently, the reaction forces tend to excite the loadbeam sway mode. Thus, the PZT driven transfer function response of the microactuator system exhibits high gain slider offtrack due to loadbeam sway at a frequency lower than the primary microactuator mode.

Figure 3:
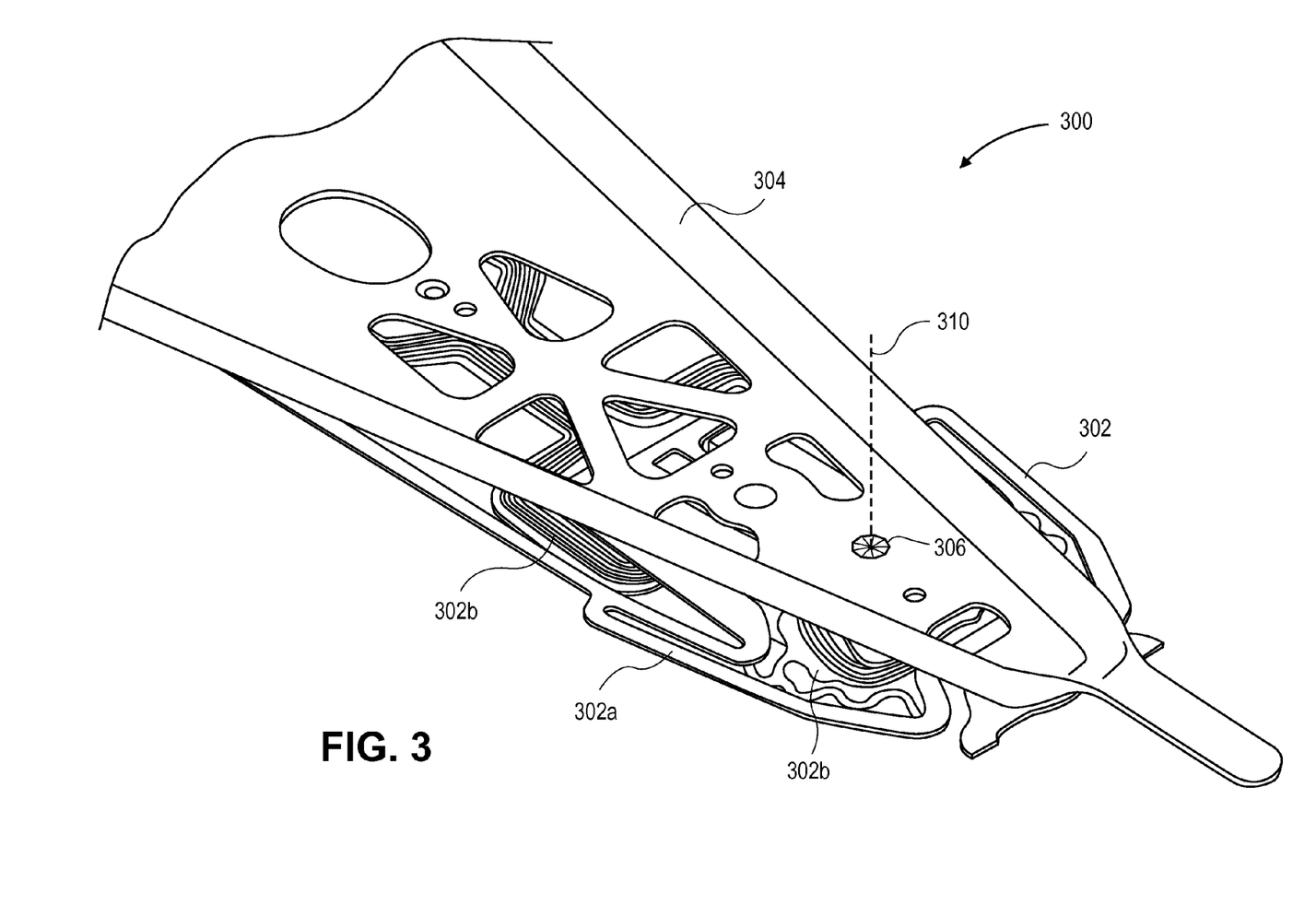
FIG. 3 is a perspective view of a head gimbal assembly (HGA), according to an embodiment of the invention.

FIG. 3 is a perspective view of a head gimbal assembly (HGA), according to an embodiment of the invention. HGA 300 comprises a flexure 302 and a load beam 304 having a dimple 306. According to an embodiment, flexure 302 comprises multiple assembled layers such as a stainless steel layer 302*a* coupled with an insulator layer 302*b*. Flexure 302 may also, but need not, comprise a separate conductor layer, as described in the '508 patent. Flexure 302 is movably coupled to the loadbeam 304 via the gimbal 306 and has freedom of rotation about the dimple axis 310. Because a slider is coupled to a slider attachment platform 402 (FIG. 4A) of flexure 302, the slider likewise has freedom of rotation about dimple axis 310.

Figure 4A:
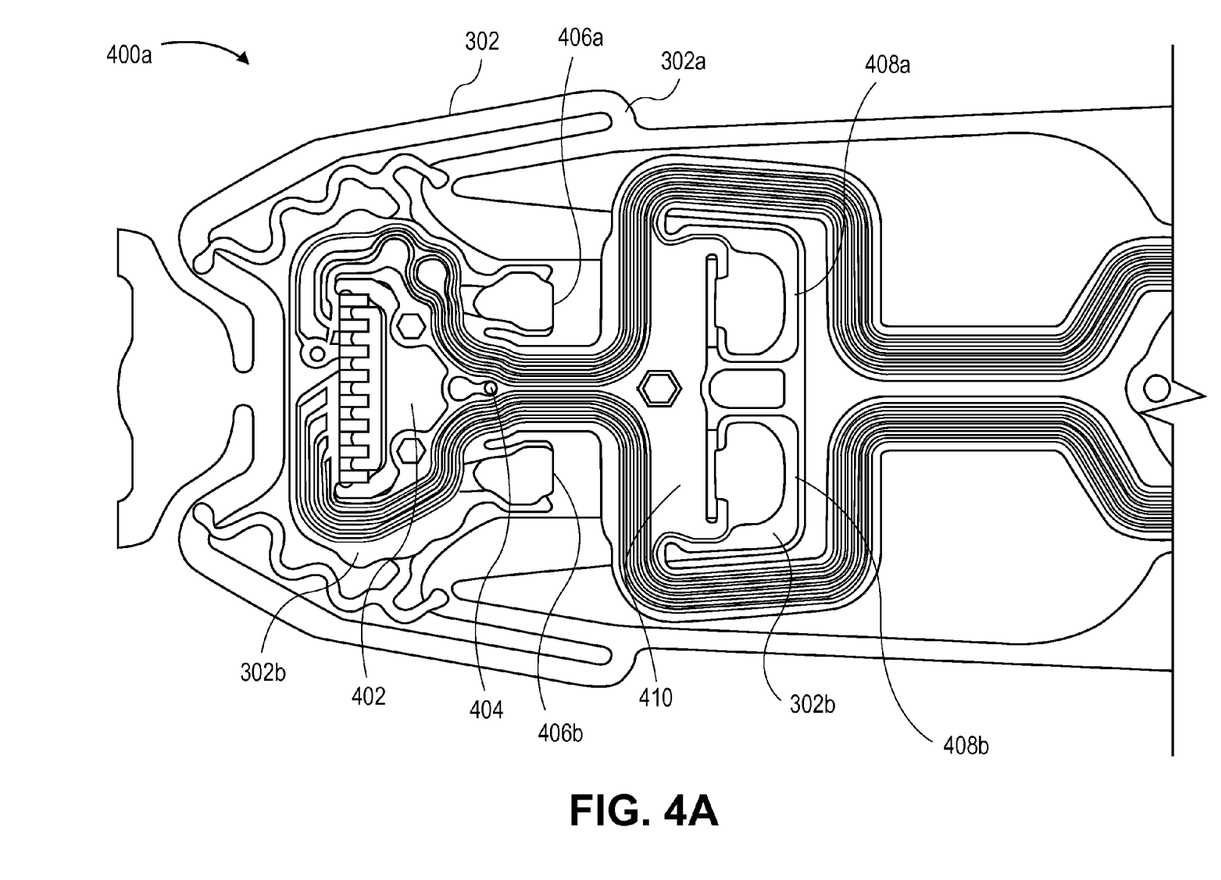
FIG. 4A is a bottom plan view of a flexure gimbal assembly, illustrated with slider and piezo actuating devices omitted, according to an embodiment of the invention.

FIG. 4A is a bottom plan view of a flexure gimbal assembly, according to an embodiment of the invention, illustrated with the slider and the piezo actuating devices omitted. Flexure gimbal assembly 400*a* comprises the flexure 302 which comprises the stainless steel layer 302*a* and the insulator layer 302*b* (FIG. 3). Flexure gimbal assembly 400*a* further comprises a slider attachment platform 402, gimbal area 404, and a flexure tongue 410. When flexure gimbal assembly 400*b* (FIG. 4B) is coupled with load beam 304 (FIG. 3), gimbal area 404 mates with the gimbal 306 (FIG. 3) of load beam 304. Consequently, the dimple axis 310 runs through gimbal area 404 coaxial with gimbal 306. Therefore, flexure gimbal assembly 400*b* is movably coupled with load beam 304 through gimbal 306 and gimbal area 404.

Figure 4B:
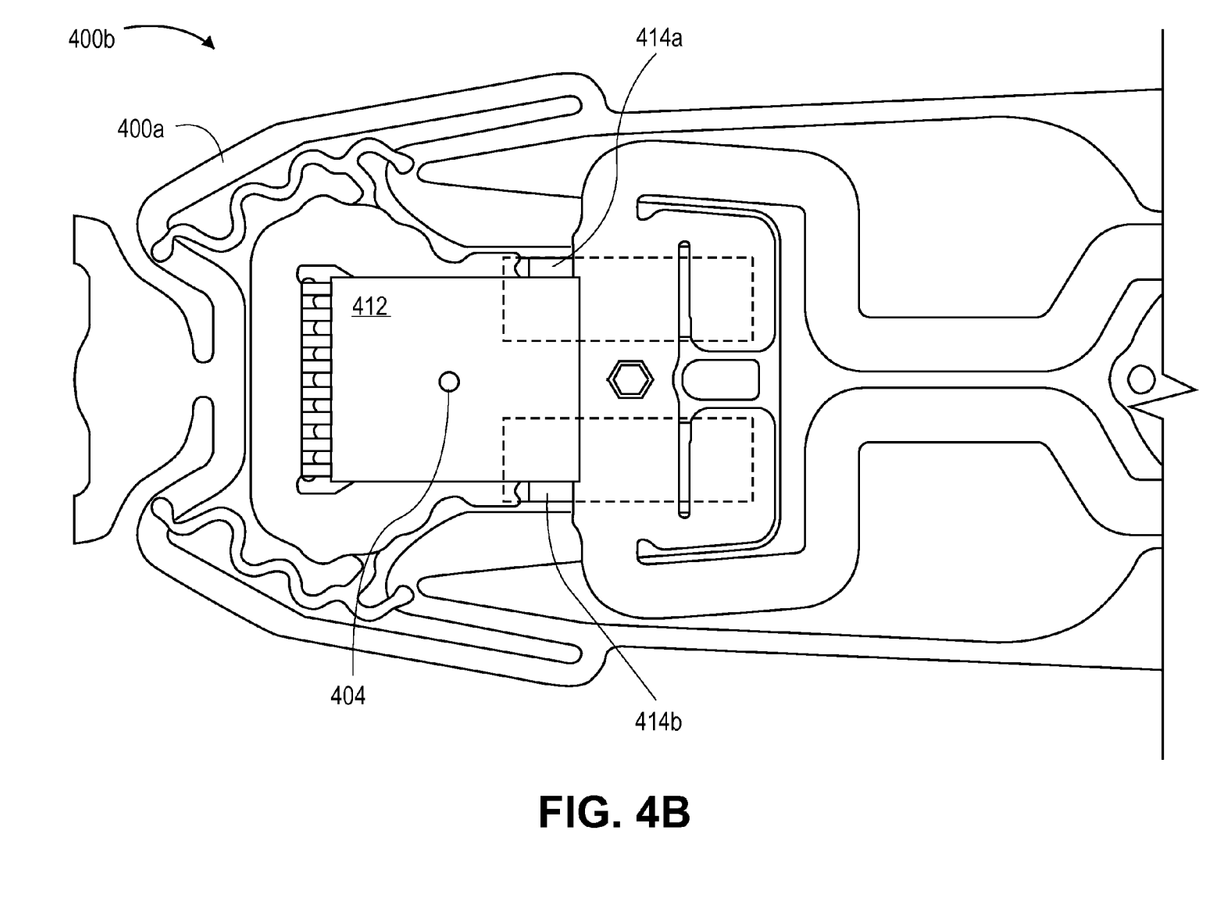
FIG. 4B is a bottom plan view of the flexure gimbal assembly of FIG. 4, illustrated with slider and piezo actuating devices in place, according to an embodiment of the invention.

FIG. 4B is a bottom plan view of the flexure gimbal assembly of FIG. 4A, illustrated with slider and piezo actuating devices in place, according to an embodiment of the invention. Flexure assembly 400*b* comprises the components of flexure assembly 400*a* of FIG. 4A, with the slider 412 (such as slider 110*b* of FIG. 1) and a piezo actuating device 414*a* and a piezo actuating device 414*b* attached. FIG. 4B further illustrates the location of gimbal area 404, roughly in the center of area of the slider 412. Slider 412 and piezo actuating devices 414*a*, 414*b*, are located on opposing sides of flexure assembly 402*a*, where the slider side is arbitrarily referred to as the bottom side and the piezo side is arbitrarily referred to as the top side.

Figure 4C:
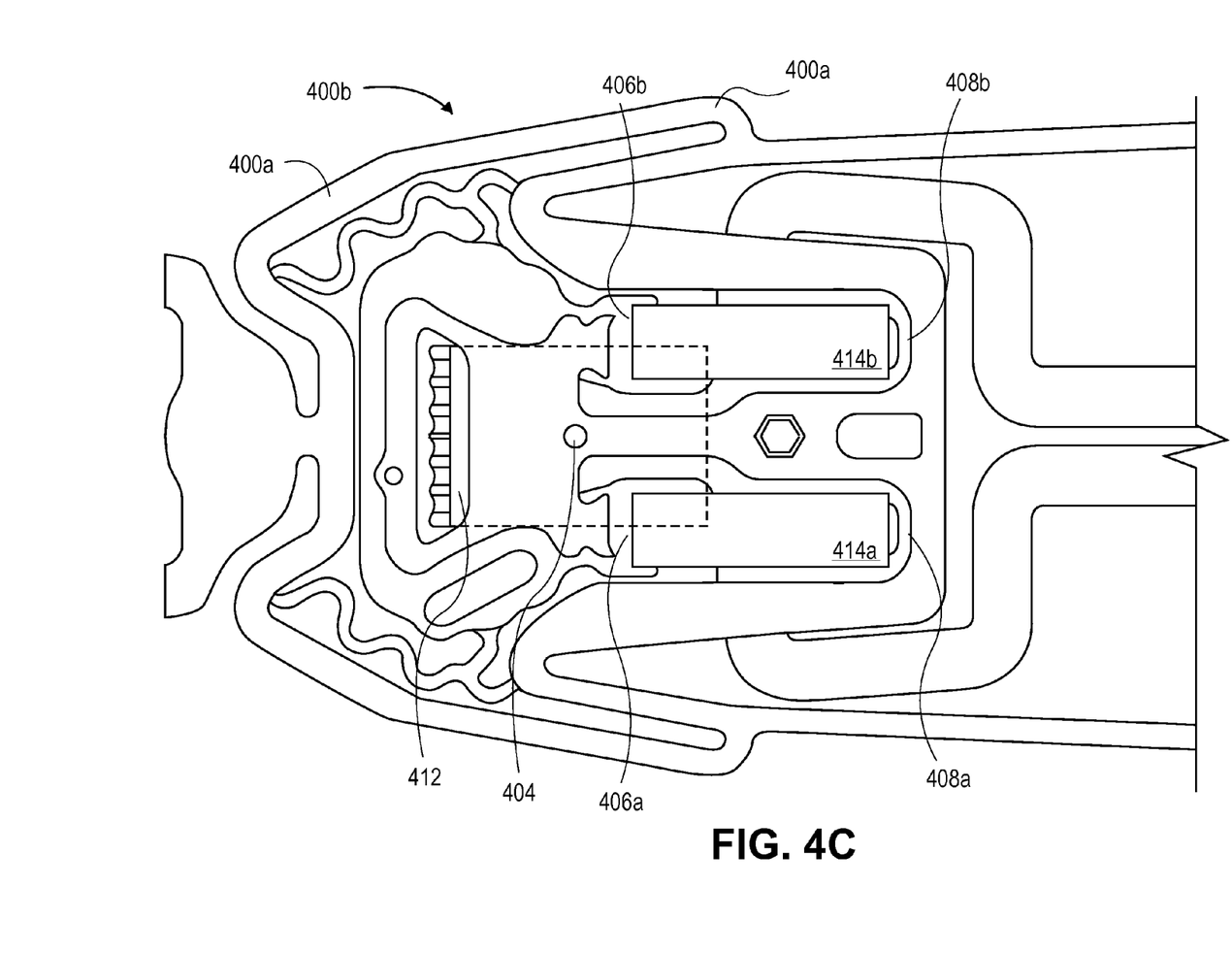
FIG. 4C is a top plan view of the flexure gimbal assembly of FIG. 4, illustrated with slider and piezo actuating devices in place, according to an embodiment of the invention.

FIG. 4C is a top plan view of the flexure gimbal assembly of FIG. 4A, illustrated with slider 412 and piezo actuating devices 414*a*, 414*b* in place, according to an embodiment of the invention. As mentioned, flexure assembly 400*b* comprises the components of flexure assembly 400*a* of FIG. 4A, with the slider 412 and piezo actuating devices 414*a*, 414*b* attached. FIG. 4B further illustrates the location of gimbal area 404, roughly in the center of area of the slider 412.

As is illustrated in FIGS. 4B and 4C, each piezo actuating device 414*a*, 414*b* is mounted at one end (distal end) to a respective piezo hinge 406*a* and piezo hinge 406*b*, and at the other end (proximal end) to a respective leading edge portion 408*a* and leading edge portion 408*b*, of flexure tongue 410.

The microactuator selectively rotates the slider 412 about the dimple axis 310 (FIG. 3). Opposite polarity voltage is applied to the two different piezo actuating devices 414*a* and 414*b*, such that one piezo expands and the other piezo contracts to rotate the slider 412, under a corresponding moment force. Piezo hinge 406*a* and piezo hinge 406*b* allow the two different piezos to simultaneously extend and contract in a linear manner, while allowing the slider attachment platform 402 and slider 412 to rotate.

Mass Balancing the Flexure Gimbal Assembly for Sway Mode Control

As illustrated in FIGS. 3, 4A-4C, the dimple axis 310 and gimbal area 404 are located roughly in the center of area and center of mass of slider 412, which is the target of the microactuation corresponding to the secondary actuator system. However, there is more than solely the slider 412 that is subject to the moment force. The other physically connected components of HGA 300 are also subject to the moment force and, resultantly, may generate one or more opposing forces.

In microactuator systems such as shown in FIGS. 4A-4C, wherein two piezo actuating devices are located within the flexure gimbal just behind the slider center and which are driven out of phase with each other, forces tend to couple in other modes of vibration. In particular, such forcing excites the loadbeam sway mode. Thus, the PZT driven transfer function response exhibits high gain slider offtrack due to loadbeam sway at a frequency lower than the primary microactuator mode.

The sway mode is a structural resonance mode of vibration. Structural resonance modes of the head stack and suspension assembly are one of the major limiting factors for achieving higher head-positioning servo performance in hard disk drives. These lightly damped resonance modes can be excited by airflow generated from disk rotation and other disturbances and cause head off-track motion. They also limit the achievable servo bandwidth of the track-following servo system. Active control of these vibration modes requires a very high bandwidth and sampling frequency. However, the sampling frequency of the position error signal (PES) is limited by the number of servo sectors allocated to store position information on a data track.

Figure 5:
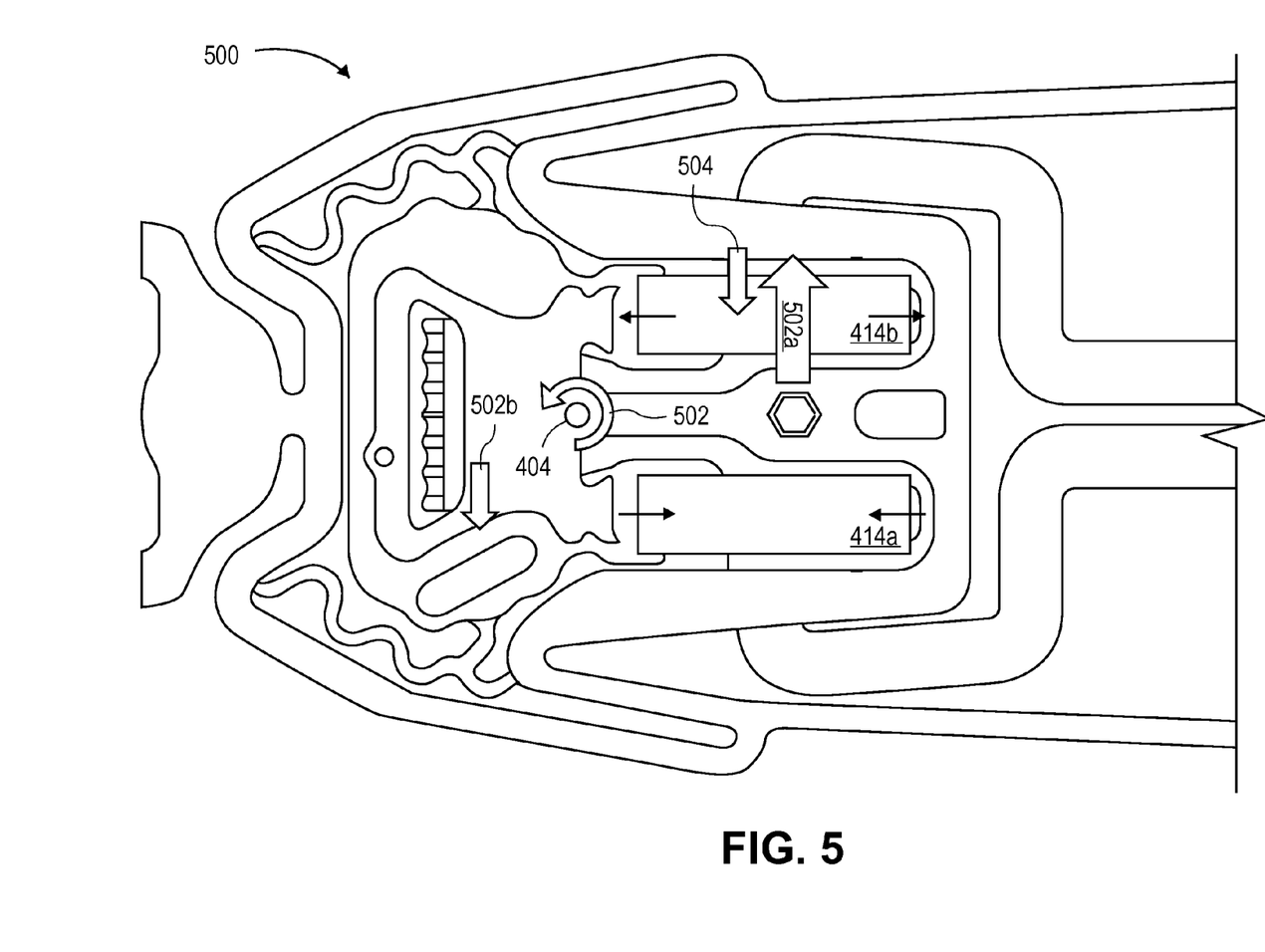
FIG. 5 is a top plan view of a flexure gimbal assembly in an unbalanced state, annotated with actuation and reaction forces.

FIG. 5 is a top plan view of a flexure gimbal assembly 500, annotated with actuation and reaction forces, in an unbalanced gimbal state. FIG. 5 illustrates piezo actuating device 414a and piezo actuating device 414b being driven electrically in order to microactuate the rotational movement of slider 412 about gimbal area 404. Any deformation of the flexure gimbal assembly that may occur during such microactuation has been omitted for purposes of clarity. FIG. 5 depicts piezo actuating device 414a contracting and piezo actuating device 414b expanding, thereby creating a moment 502 (counterclockwise) about gimbal area 404.

A rightward lateral component of moment 502 is depicted as force 502a and a leftward lateral component of moment 502 is depicted as force 502b. For illustration purposes, each of the block arrows representing lateral forces 502a and 502b are shown with a relative size to generally represent the magnitude of the respective lateral forces 502a and 502b. Thus, the block arrow representing force 502a is shown greater in size than block arrow representing force 502b, to represent the greater force that is imparted from the proximal portion of the flexure gimbal assembly due to its greater mass (in part due to the mass of the piezo actuating devices 414a and 414b) than is imparted from the distal portion of the flexure gimbal assembly due to its lesser mass, which is an effect of the unbalanced moment 502 about gimbal area 404. Due to this unbalanced moment 502 and greater lateral force 502a, the physically connected components of HGA 300 impart an opposing lateral force 504 to counter the difference between force 502a and force 502b. It is this interaction of forces that is found to primarily excite one or more vibration modes of HGA 300, such as the sway mode of vibration associated with load beam 304 (FIG. 3). Further, these forces are transferred back to, and excite vibration modes of, the actuator and actuator arm(s), such as the VCM and arm 132 (FIG. 1).

Figure 6:
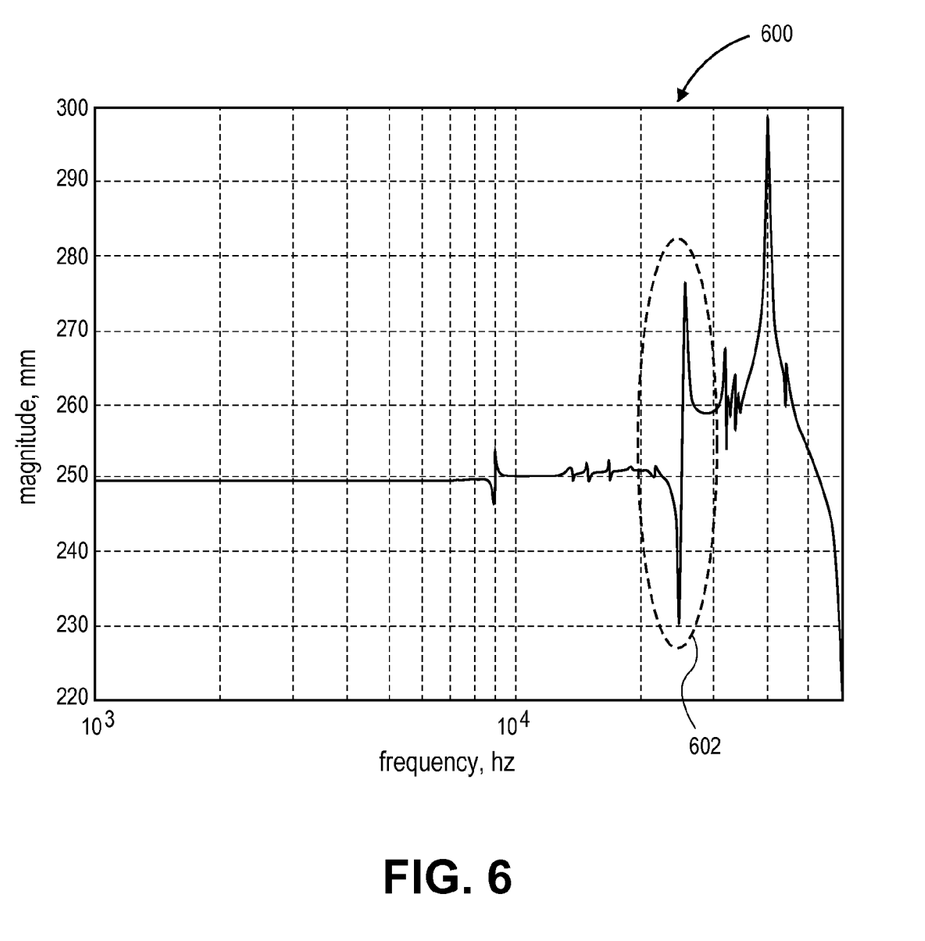
FIG. 6 is a graph illustrating the microactuator transfer function, with the flexure gimbal in an unbalanced state.

FIG. 6 is a graph illustrating the microactuator transfer function, in an unbalanced gimbal state, such as the state illustrated in FIG. 5. Note the perturbation, or spike, in displacement magnitude around 24-25 KHz, shown within the ellipse 602. This perturbation represents the excitation of the sway mode of HGA 300 (FIG. 3), generally, and load beam 304 (FIG. 3) specifically.

Figure 7:
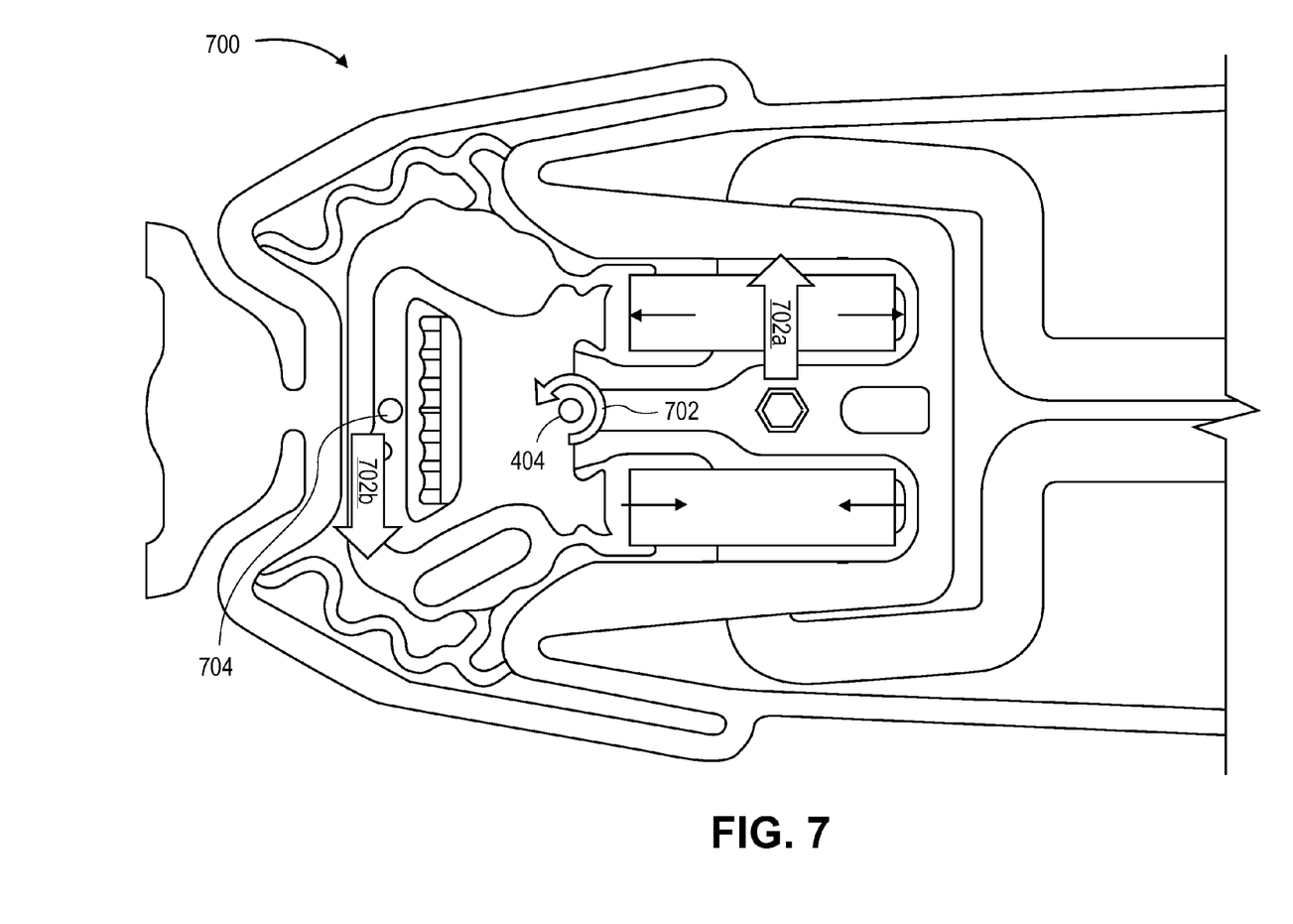
FIG. 7 is a top plan view of a flexure gimbal assembly in a mass balanced gimbal state, annotated with actuation and reaction forces, according to an embodiment of the invention.

FIG. 7 is a bottom plan view of a flexure gimbal assembly 700, annotated with actuation and reaction forces, in a mass balanced gimbal state according to an embodiment of the invention. FIG. 7 illustrates piezo actuating device 414a and piezo actuating device 414b being driven electrically in order to microactuate the rotational movement of slider 412 about gimbal area 404. Any deformation of the flexure gimbal assembly that may occur during such microactuation has been omitted for purposes of clarity. FIG. 7 depicts piezo actuating device 414a contracting and piezo actuating device 414b expanding, thereby creating a moment 702 (counterclockwise) about gimbal area 404.

A rightward lateral component of moment 702 is depicted as force 702a and a leftward lateral component of moment 702 is depicted as force 702b. As with FIG. 5, for illustration purposes each of the block arrows representing lateral forces 702a and 702b are shown with a relative size to generally represent the magnitude of the respective lateral forces 702a and 702b. Thus, the block arrow representing force 702a is shown equal in size to the block arrow representing force 702b, to represent the equal forces that are imparted from the proximal portion of the flexure gimbal assembly and from the distal portion of the flexure gimbal assembly due to their equal masses, due to the now balanced moment 702 about gimbal area 404.

In comparison with the flexure gimbal assembly 500 of FIG. 5, the flexure gimbal assembly 700 of FIG. 7 is balanced by a mass 704 attached to the distal side of the flexure gimbal assembly 700. Alternatively, the flexure itself could be tuned to balance the flexure gimbal assembly 700, instead of attaching a mass 704 to the flexure gimbal assembly 700. For example, and according to an embodiment, the material for any or all of the stainless steel layer 302a, the copper conductor layer, and the insulator layer 302b could be selectively thickened in places or extended out the distal end of the flexure to balance the flexure gimbal assembly 700 without adding additional parts. In any case described, due to this balanced moment 702 the rightward lateral force 702a and the leftward lateral force 702b are balanced and the physically connected components of HGA 300 do not impart any significant opposing lateral force to the structure. Therefore, the sway mode of vibration associated with HGA 300 (FIG. 3), generally, and load beam 304 (FIG. 3), specifically, are not excited.

Optimally, the further the mass is from the point of rotation the more effective it is in balancing the flexure assembly. Similarly, the higher the density of the mass material the smaller in size it may be and, therefore, the more readily it can be integrated into the structure of the flexure assembly. According to one embodiment, the mass used to balance the flexure assembly is tungsten, but practice of the embodiments of the invention is not limited to use of tungsten.

Note that the location of the mass may be configuration dependent and, therefore, may vary from implementation to implementation. For example, the mass may be attached to the top side or the bottom side of the flexure gimbal assembly. Further, the method of attachment of the mass may also vary from implementation to implementation. According to one embodiment, the mass is bonded to the flexure gimbal assembly using an adhesive.

Figure 8:
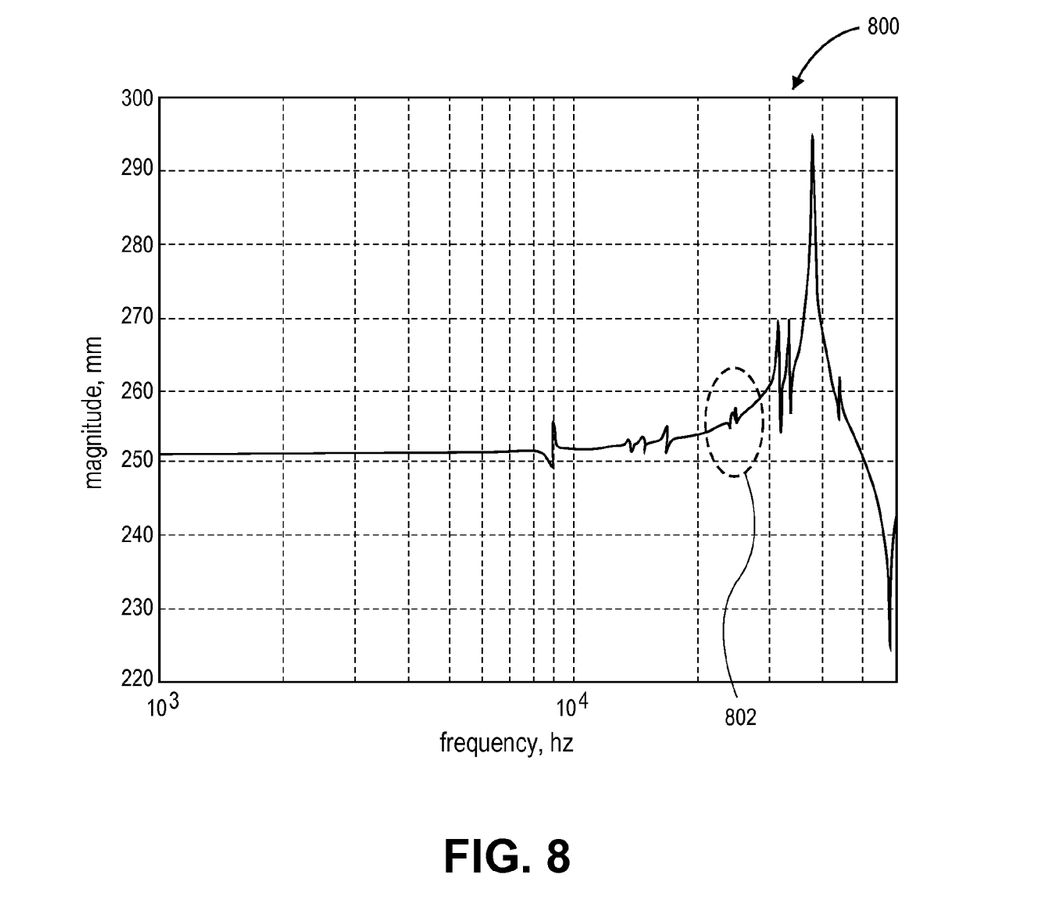
FIG. 8 is a graph illustrating the microactuator transfer function, with the flexure gimbal in a mass balanced state, according to an embodiment of the invention.

To further illustrate this result of mass balancing the flexure gimbal assembly, FIG. 8 is a graph illustrating the microactuator transfer function in a mass balanced gimbal state, such as the state illustrated in FIG. 7, according to an embodiment of the invention. Note the absence of any significant perturbation in displacement magnitude around 24-25 KHz, shown within the ellipse 802. Compared with the displacement response shown within ellipse 602 of FIG. 6 corresponding to an unbalanced flexure gimbal assembly, the displacement response shown within ellipse 802 for a mass balanced flexure gimbal assembly is greatly reduced, with the sway mode displacement perturbation effectively eliminated.

Figure 10:
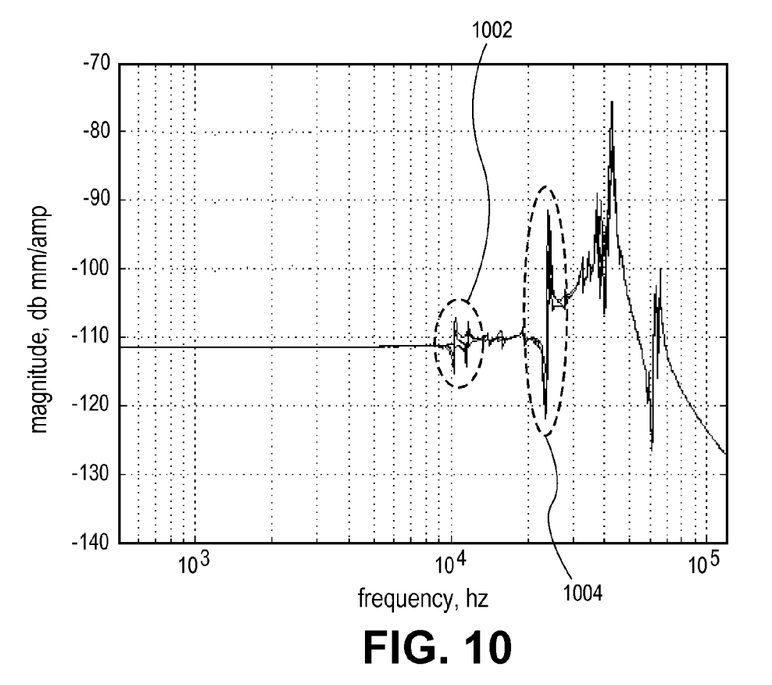
FIG. 10 is a graph illustrating the microactuator transfer function with the flexure gimbal in an unbalanced state, for a five-arm/eight-head head-stack assembly (HSA)

FIG. 10 is a graph illustrating the microactuator transfer function with the flexure gimbal in an unbalanced state, such as the state illustrated in FIG. 5, for a five-arm/eight-head head-stack assembly (HSA). The graph of FIG. 10 is an overlay of the response of each of the five arms corresponding to the eight heads of the HSA. FIG. 10 further illustrates the effect of mass balancing the flexure gimbal assembly on lower frequency modes associated with the primary actuator and corresponding actuator arm(s). Note the perturbations in displacement magnitude around 10 KHz and 11 KHz, shown within the ellipse 1002. The 10 KHz perturbation represents the so-called butterfly mode associated with the primary actuator (as it "bounces" back and forth on the pivot bearing structure), with the inner heads experiencing the majority of the motion. The 11 KHz perturbation represents the arm sway mode, in which the primary motion is a swaying of the HSA arm(s) coupled with additional motion of the load beam and flexure gimbal, with the greater motion experienced by the outer heads.

Figure 11:
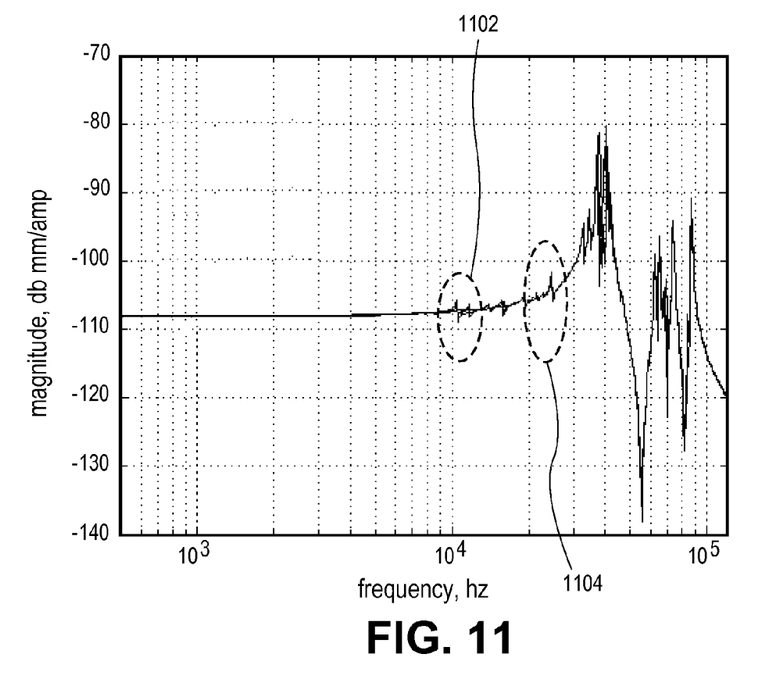
FIG. 11 is a graph illustrating the microactuator transfer function in a mass balanced gimbal state, such as the state illustrated in FIG. 7, for a five-arm/eight-head head-stack assembly, according to an embodiment of the invention.

To further illustrate this result of mass balancing the flexure gimbal assembly, FIG. 11 is a graph illustrating the microactuator transfer function in a mass balanced gimbal state, such as the state illustrated in FIG. 7, for a five-arm/eight-head head-stack assembly, according to an embodiment of the invention. Note the absence of any significant perturbation in displacement magnitude around 10 KHz and 11 KHz, shown within the ellipse 1102. Compared with the displacement response shown within ellipse 1002 of FIG. 10, corresponding to an unbalanced flexure gimbal assembly, the displacement response shown within ellipse 1102 for a mass balanced flexure gimbal assembly is greatly reduced for the lower frequency mode displacement perturbations (i.e., the actuator butterfly mode and the arm sway mode).

Again also recognize that, compared with the displacement response shown within ellipse 1004 (FIG. 10) corresponding to an unbalanced flexure gimbal assembly, the displacement response shown within ellipse 1104 (FIG. 11) for a mass balanced flexure gimbal assembly is greatly reduced, with the primarily load beam sway mode displacement perturbation effectively eliminated.

The foregoing description shows that several of the vibration modes associated with an HGA and an HSA (including a single arm "stack") of an HDD can be tuned by mass balancing the flexure gimbal assembly (e.g., that of flexure gimbal assembly 402b of FIGS. 4A and 4B). That is, the lateral forces causing, for example, the load beam sway mode (e.g., that of load beam 304 of FIG. 3), the actuator butterfly mode (e.g., that of the VCM) and the arm sway mode (e.g., that of arm 132 of FIG. 1), can be substantially eliminated. A process for determining the amount of mass needed to balance, or tune, a flexure gimbal assembly of an HGA of a HDD is as follows, according to an embodiment.

The mode shape in consideration is comprised of both loadbeam sway motion and yawing of the flexure gimbal/PZT assembly, with the slider attached to the gimbal. Such yawing of the gimbal/PZT assembly is characterized using x,y,z, and voltage degrees of freedom. To examine performance through simulation, a voltage forcing function is placed on each piezo actuating device, driven in opposite directions, and resultant slider offtrack is calculated. Since the voltage forcing function is in the direction of yaw, the nominal (unweighted) case results in a high slider offtrack gain.

Finite element analysis (FEA) can be used to determine the mass needed to balance the structure such that yawing is eliminated. A point mass element is attached to the flexure structure at the gimbal end opposite of the heavier piezo actuating device assembly. The mass of the element is incrementally increased and the resulting slider offtrack due to sway mode is tracked. At the point in which mass balance is reached, the yawing motion of the gimbal proximal end (holding piezo actuating devices) is changed into a translation of the gimbal structure. Using the FEA model, the voltage output of each piezo actuating device due to motion is calculated, showing that the piezo actuating devices of the weighted flexure outputs less voltage (orders of magnitude less) than those of the non-weighted flexure because of such a change in motion from yaw to translation. Since the piezo actuating devices are not elongating and contracting as much as they would with a yawing motion, voltage output is decreased. Thus, when the given voltage forcing function is applied, the slider motion is not excited. In practice, a weighted slug can be integrated into the flexure gimbal assembly, with size and mass determined by the above described FEA procedure.

Presented as an example, in a particular implementation of the foregoing embodiments, the mass that was needed near the location shown for mass 704 (FIG. 7) for tuning the flexure gimbal assembly (i.e., comprising the flexure gimbal, the piezo actuating devices and associated adhesive, the slider and associated slider solder ball bonding) is approximately 10% of the mass of the flexure gimbal assembly. However, the mass needed is configuration dependent and will vary from implementation to implementation.

A Method for Manufacturing a Suspension for a Hard Disk Drive

Figure 9:
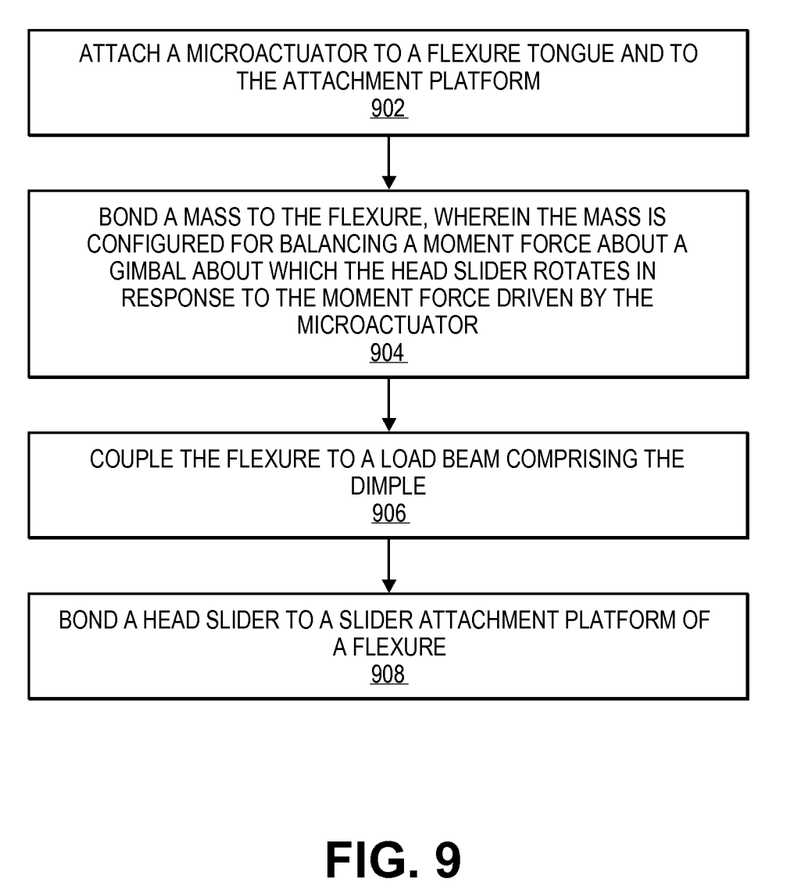
FIG. 9 is a flow diagram illustrating a method for manufacturing a suspension for a hard disk drive device, according to an embodiment of the invention.

FIG. 9 is a flow diagram illustrating a method for manufacturing a suspension for a hard disk drive device, according to an embodiment of the invention. The manufacturing process illustrated in FIG. 9 is applicable to a suspension utilized in a microactuator-enabled system, in which the microactuators (e.g., PZT motors) are located close to the slider. This is in contrast to milli-actuator systems in which the actuators are located quite a distance from the slider, such as back near the mount plate. The order in which the blocks of FIG. 9 are presented is a preferred order, however, practice of this embodiment of the invention is not limited to that exact order. Rather, the illustrated blocks could be performed in a different order than the order shown in FIG. 9.

At block 902, a microactuator is attached to a flexure tongue and to the attachment platform. For example, piezo actuating devices 414a and 414b are attached to respective leading edge portion 408a (FIG. 4A) and leading edge portion 408b (FIG. 4A) of flexure tongue 410 (FIG. 4A), and to respective piezo hinge 406a (FIG. 4A) and piezo hinge 406b (FIG. 4A) of attachment platform 402 (FIG. 4A).

At block 904, a mass is bonded to the flexure, where the mass is configured for balancing the moment force about a gimbal, about which the head slider rotates in response to the moment force driven by the microactuator. For example, mass 704 (FIG. 7) is adhesively bonded to flexure 302 (FIG. 3) to balance the microactuated moment force 702 (FIG. 7) about gimbal area 404 (FIG. 7). The appropriate amount of mass needed to balance the moment may be determined based on the foregoing procedure.

At block 906, the flexure is coupled to a load beam which comprises a dimple which mates with the gimbal area of the flexure. For example, flexure 302 (FIG. 3) is coupled to load beam 304 (FIG. 3), which comprises a dimple 306 (FIG. 3) which mates with the gimbal area 404 (FIG. 7) of the flexure 302.

At block 908, a head slider is bonded to a slider attachment platform of a flexure. For example, slider 412 (FIG. 4B) is bonded to slider attachment platform 402 (FIG. 4A) of flexure 302 (FIG. 3).

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A suspension for a hard disk drive, comprising:
    a load beam comprising a dimple;
    a flexure coupled to said load beam through said dimple and comprising a slider attachment platform;
    a slider coupled to said slider attachment platform;
    a microactuator located on a proximal side of said slider, said microactuator comprising one or more piezo actuating device configured for providing a moment force for rotating said slider about said gimbal in response to a microactuator driver; and
    a mass coupled with said flexure on a distal side of said slider opposing said proximal side, said mass specifically configured and positioned for balancing said moment force about said gimbal.

2. The suspension of claim 1, wherein the configuration and position of said mass is specifically determined to substantially eliminate lateral forces which would otherwise excite a sway vibration mode associated with said suspension.

3. The suspension of claim 1, wherein the configuration and position of said mass is specifically determined to substantially eliminate lateral forces which would otherwise excite vibration modes associated with a primary actuator and with an actuator arm that are coupled with said suspension.

4. The suspension of claim 1, wherein said mass is tungsten.

5. The suspension of claim 1, wherein the configuration and position of said mass is specifically determined to substantially eliminate lateral forces which would otherwise excite a sway vibration mode associated with said load beam and a yawing of an assembly comprising said flexure, said slider, said microactuator and said mass.

6. A hard disk drive, comprising:
    a disk media rotatably mounted on a spindle;
    a suspension coupled to an actuator arm and comprising,
        a load beam comprising a dimple,
            a flexure coupled to said load beam through said dimple and comprising a slider attachment platform,
    a head slider coupled to said slider attachment platform and housing a read/write transducer for reading data from and writing data to said disk media,
    a microactuator located on a proximal side of said slider, said microactuator coupled to said flexure and comprising one or more piezo actuating device configured for providing a moment force for rotating said slider and a portion of said flexure about said gimbal, and
    a mass coupled with said flexure on a distal side of said slider opposing said proximal side, said mass specifically configured and positioned for balancing said moment force about said gimbal;
    a voice coil motor configured to move said suspension and said head slider to access portions of the disk media.

7. The hard disk drive of claim 6, wherein the configuration and position of said mass is specifically determined to substantially eliminate lateral forces which would otherwise excite a sway vibration mode associated with said suspension.

8. The hard disk drive of claim 6, wherein the configuration and position of said mass is specifically determined to substantially eliminate lateral forces which would otherwise excite vibration modes associated with a primary actuator and with an actuator arm that are coupled with said suspension.

9. The hard disk drive of claim 6, wherein said mass is tungsten.

10. The hard disk drive of claim 6, wherein the configuration and position of said mass is specifically determined to substantially eliminate lateral forces which would otherwise excite a sway vibration mode associated with said load beam and a yawing of an assembly comprising said flexure, said slider, said microactuator and said mass.

11. A method for manufacturing a suspension for a hard disk drive, the method comprising:
    attaching a microactuator to a flexure tongue and to a flexure slider attachment platform on a proximal side of a head slider;
    bonding a mass to said flexure on a distal side of said slider opposing said proximal side, wherein said mass is specifically configured and positioned for balancing a moment force about a gimbal about which said head slider rotates in response to said moment force driven by said microactuator;
    coupling said flexure to a load beam; and
    bonding a head slider to said flexure slider attachment platform.

* * * * *